United States Patent
Foith et al.

(10) Patent No.: US 6,300,866 B1
(45) Date of Patent: Oct. 9, 2001

(54) METHOD FOR DETERMINING THE SEVERITY OF A VEHICLE COLLISION

(75) Inventors: Petra Foith, Uebersee; Peter Bachmaier, Grossnoebach; Michael Holzner, Grafing; Martin Peller, Fuerstenfeldbruck; Andreas Kuhn, Munich, all of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/443,458

(22) Filed: Nov. 19, 1999

(30) Foreign Application Priority Data

Nov. 19, 1998 (DE) ................................................ 198 53 409

(51) Int. Cl.⁷ ........................................................ B60Q 1/00
(52) U.S. Cl. ........................... 340/436; 340/438; 340/439
(58) Field of Search ............................ 340/436, 438, 340/439

(56) References Cited

U.S. PATENT DOCUMENTS

| | | | |
|---|---|---|---|
| 4,836,024 | * | 6/1989 | Woehrl et al. ............................ 73/514 |
| 5,202,831 | * | 4/1993 | Blackburn et al. ............... 364/424.05 |
| 5,484,166 | * | 1/1996 | Mazur et al. ............................ 280/735 |
| 5,746,444 | * | 5/1998 | Foo et al. ................................ 280/735 |
| 5,928,300 | * | 7/1999 | Rogers et al. ............................ 701/45 |
| 5,935,182 | * | 8/1999 | Foo et al. ................................. 701/45 |
| 5,961,562 | * | 10/1999 | Iyoda ....................................... 701/45 |

FOREIGN PATENT DOCUMENTS

| | | |
|---|---|---|
| 37 37 554 | 5/1989 | (DE) . |
| 42 22 595 | 1/1993 | (DE) . |
| 197 15 575 | 9/1998 | (DE) . |
| 0 327 853 | 8/1989 | (EP) . |

* cited by examiner

Primary Examiner—Jeffery Hofsass
Assistant Examiner—Son Tang
(74) Attorney, Agent, or Firm—Crowell & Moring LLP

(57) ABSTRACT

A method is provided for determining the severity and pattern of a vehicle collision. A plurality of crash sensors are located in various points in the vehicle. Output signals from the crash sensors are fed to an evaluation unit. The output signals of the crash sensors are related to a system of coordinates that is invariable relative to the vehicle. Information about the movement of the sensor locations and the system of coordinates is obtained from the output signals.

13 Claims, 1 Drawing Sheet

METHOD FOR DETERMINING THE SEVERITY OF A VEHICLE COLLISION

BACKGROUND AND SUMMARY OF THE INVENTION

This application claims the priority of German Application No. 198 53 409.4, filed Nov. 19, 1998, the disclosure of which is expressly incorporated by reference herein.

The invention relates to a method for determining the severity and pattern of a vehicle collision, by locating a plurality of crash sensors located at various points in the vehicle, whose output signals are fed to an evaluation unit.

This type of method is widely used today. The output signals from a central acceleration sensor and other crash sensors, preferably located on the seat cross members, are fed to the evaluation unit. Together with the trend of providing ever more safety devices such as airbags, seat belt tensioners, etc. in a vehicle, the need to control these devices to suit this trend is also growing. This means, however, that frequently only individual devices are triggered while the rest remain unchanged. For this purpose, many more crash sensors are being provided at various points in the vehicle in order to track a crash event as accurately and directly as possible.

With the increasing number of crash sensors, however, comes the growing problem of being able to interpret the sensor signals correctly. It is known from U.S. Pat. No. 5,583,771 to store the output signal from an individual acceleration sensor for a specific period of time in terms of its pattern and to determine from the signal pattern a number of items of information such as amplitude, speed, etc. This information is entered as input information into a neural network, which alone decides whether an individual airbag is triggered.

If several crash sensors are used, their output signals cannot be analyzed sufficiently accurately in a similar fashion using a neural net. There is also the dependence of acceleration sensors on direction. For example, if the acceleration sensor is able to detect a front-end crash, a side crash then as a rule cannot be detected or at least cannot be detected with the same accuracy. An individual acceleration sensor of this kind as a rule is located centrally in the vehicle. As a result of the vehicle structure, deceleration takes place at the location of the acceleration sensor only with a delay and with a pattern that is completely different from the pattern found for example at the point of impact of an obstacle. As a rule, this results in significant problems in determining the severity of the vehicle collision with sufficient precision.

The goal of the present invention is to provide a method for determining the severity and pattern of a vehicle collision, which method provides a much better indication of the vehicle collision.

The invention achieves this goal by a method for determining the severity and pattern of a vehicle collision, by locating a plurality of crash sensors at various points in the vehicle, whose output signals are fed to an evaluation unit. The output signals from the crash sensors are based on a system of coordinates that is invariable relative to the vehicle. Information about the movement of the sensor locations relative to the system of coordinates can be obtained from the output signals of the crash sensors.

As a result of the plurality of crash sensors, a total of eight for example, it is not only possible to get an idea of the severity but also of the course (pattern) of the vehicle collision—provided its output signals are related to a system of coordinates integral with the vehicle.

The result is a method which makes it possible at low cost to supply information about the severity and course of a vehicle collision rapidly and reliably and to control occupant protective devices as needed.

Other objects, advantages and novel features of the present invention will become apparent from the following detailed description of the invention when considered in conjunction with the accompanying drawings.

BRIEF DESCRIPTION OF THE DRAWING

The single FIGURE is a top plan view illustrating a relative system of coordinates integral with a vehicle in accordance with the present invention.

DETAILED DESCRIPTION OF THE DRAWING

Figure 1:
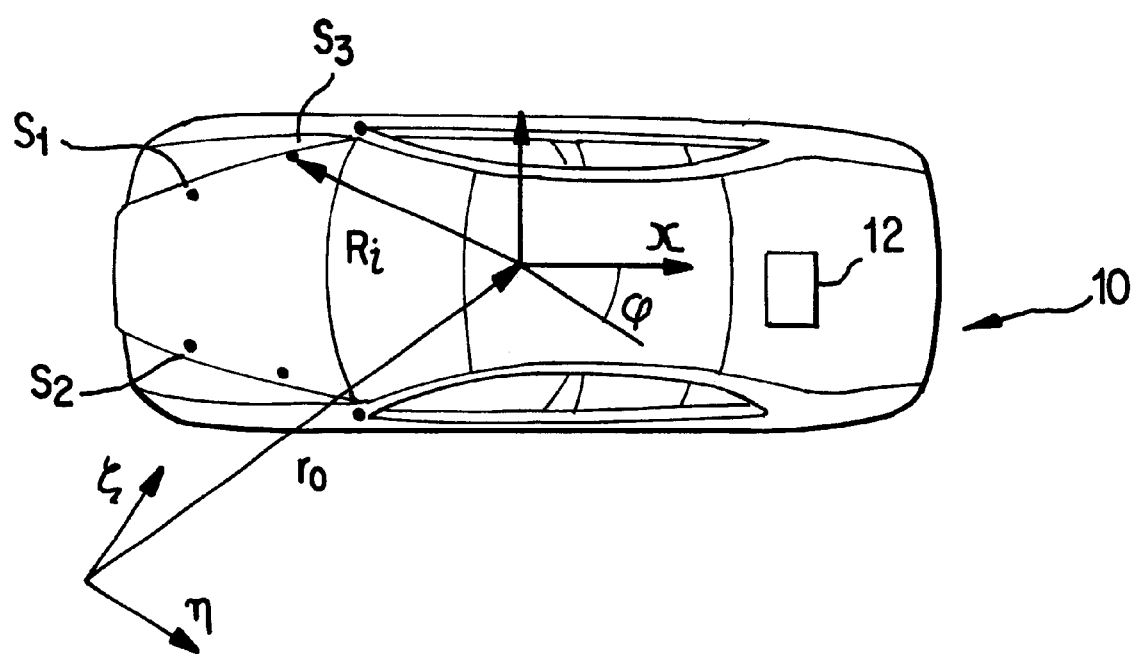

Referring to the figure, a top plan view of a vehicle 10 is shown. The vehicle 10 is equipped with a plurality of crash sensors, of which only a few sensors S1–S3 are identified in the drawing. Each of these sensors outputs a signal to an evaluation unit 12 for processing. A relative system of coordinates $\{x, y\}$ is integrally associated with the vehicle 10 in an invariable manner. Information about the movement of the sensor locations and the system of coordinates is obtained from the output signals from the crash sensors.

In order better to interpret and process the plurality of sensor signals that appear, it is also advantageous to integrate the acceleration signals that appear several times in order to display the resultant speeds and displacements in the relative system of coordinates integral with the vehicle. The mathematical/physical fundamentals for this are given below.

Let $\{x, y\}$ be the relative system of coordinates integral with the vehicle. The position of the vehicle is given by the zero point $r_0 = r_0(t)$ of the system of coordinates in an inertial system $\{\eta, \zeta\}$ and the twist $\phi = \phi(t)$. The position of the inertial system is arbitrary and it is no longer contained in the formulas at the end. Every point on the automobile can then be described absolutely with this zero point, the twist (relative angular rotation), and its relative vehicle coordinates R (FIG. 1):

$$r_{abs} = r_0 + BR \qquad \text{Eqn. (1)}$$

where matrix B gives the angular rotation of the relative system relative to the inertial system:

$$B = \begin{pmatrix} \cos\phi & -\sin\phi \\ \sin\phi & \cos\phi \end{pmatrix} \qquad \text{Eqn. (2)}$$

In the following, the notation is chosen so that vectors are printed in bold, uppercase vectors relate to the relative system, and lowercase vectors refer to the inertial system. The speeds are obtained by differentiation of Eqn. (1):

$$V_{abs} = V_0 + \dot{B}R + B\dot{R} \qquad \text{Eqn. (3)}$$

In the normal case, the automobile remains undeformed while driving. The relative speed vanishes:

$$V_{soll} = V_0 + \dot{B}R \qquad \text{Eqn. (4)}$$

A relative movement $V_{abs} - V_{soll} \neq 0$ appears only during an accident. This is given by $$V = \dot{R} = B^{-1}V_{abs} - V_0 - B^{-1}\dot{B}R$$

$$V = \dot{R} = B^{-1}v_{abs} - V_0 - B^{-1}\dot{B}R \qquad \text{Eqn. (5)}$$

$$= V_{abs} - V_0 - \dot{\varphi}\begin{pmatrix} 0 & -1 \\ 1 & 0 \end{pmatrix}V_{abs}$$

With the aid of the values given below for $V_0$, $\varphi$, and R, the speed is provided by acceleration sensors in the relative system of coordinates integral with the vehicle. In the same way, relative displacements can be obtained.

Ideally, $V_0$ and $\psi$ in Eqn. (5) could be set by driving-dynamic control systems.

An alternative possibility for determining the movement of the relative system is provided by the integration of the acceleration signals.

If one knows the absolute speeds $V_1$ and $V_2$ of two sensors, from which it is assumed that they perform no relative movement relative to one another, and inserts them in Equation (5) for V, four scalar equations are obtained for the three unknowns $\psi$, $V_{\{0,x\}}$, $V_{\{0,y\}}$ $$V_{1,x} = V_{0,x} - \psi R_{1,y}$$

$$V_{1,y} = V_{0,y} - \psi R_{1,x}$$

$$V_{2,x} = V_{0,x} - \psi R_{2,y}$$

$$V_{2,y} = V_{0,y} - \psi R_{2,x}$$

By solving one of the equations, we obtain $$\begin{pmatrix} V_{0,x} \\ V_{0,y} \\ \dot{\phi} \end{pmatrix} = \frac{1}{R_{2,y} - R_{1,y}} \begin{pmatrix} R_{2,y} & 0 & -R_{1,y} \\ -R_{1,x} & R_{2,y} - R_{1,y} & R_{1,x} \\ 1 & 0 & -1 \end{pmatrix} \begin{pmatrix} V_{1,x} \\ V_{1,y} \\ V_{2,x} \end{pmatrix} \qquad \text{Eqn. (6)}$$

$$\begin{pmatrix} V_{0,x} \\ V_{0,y} \\ \dot{\phi} \end{pmatrix} = \frac{1}{R_{1,x} - R_{2,x}} \begin{pmatrix} R_{1,x} - R_{2,x} & R_{1,y} & -R_{1,y} \\ 0 & R_{2,x} & R_{1,x} \\ 0 & 1 & -1 \end{pmatrix} \begin{pmatrix} V_{1,x} \\ V_{1,y} \\ V_{2,y} \end{pmatrix} \qquad \text{Eqn. (7)}$$

Conventional acceleration sensors measure absolute accelerations in the relative system of coordinates integral with the vehicle. In other words, in $$a_{abs} = B(t)A_{abs} \qquad \text{Eqn. (8)}$$

only $A_{abs}$ is known. For the absolute speed we then have $$v(t+dt) = \int_t^{t+dt} a(\tau)d\tau + v(t) \qquad \text{Eqn. (9)}$$

$$= \int_t^{t+dt} B(\tau)A(\tau)d\tau + v(t)$$

Approximation of the integral in Eqn. (9) with the rectangular rule supplies $$v(t+dt) = B(t+dt)A(t+dt)dt + v(t) \qquad \text{Eqn. (10)}$$

This equation is transformed into the current relative system of coordinates:

$$V(t+dt) = A(t+dt)dt + B^{-1}(t+dt)B(t)V(t) \qquad \text{Eqn. (11)}$$

The product of the transformation matrices can be approximated by $$B^{-1}(t+dt)B(t) \approx \begin{pmatrix} \cos(\dot{\varphi}dt) & \sin(\dot{\varphi}dt) \\ -\sin(\dot{\varphi}dt) & \cos(\dot{\varphi}dt) \end{pmatrix} \qquad \text{Eqn. (12)}$$

During the integration of Eqns. (11) and (12) over a longer period of time, the arithmetic errors that develop can be compensated from time to time. The logical time interval for this depends on the scanning rate and the quality of the information from the driving dynamic systems for example, which supply information about the movement of the relative system in the absolute system.

As a result, relative speed and displacement samples are obtained that can be interpreted better than simple acceleration signals with which the individual types of collision can be detected more simply and distinguished from one another using these patterns. Thus, the location and relative speed of the sensor with the greatest relative movement is linked with the impact location and the impact direction of the other car. Collision classification based on the different displacement patterns is then performed by using artificial neural networks for example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining information on a vehicle collision via a plurality of sensors coupled with an evaluation unit, the method comprising the acts of:
   locating the plurality of crash sensors at various points in a vehicle;
   basing output signals from said plurality of crash sensors on a system of coordinates that is invariable relative to the vehicle; and
   obtaining information about movement of said sensors locations at the various points relative to the system of coordinates from the output signals of said sensors.

2. The method according to claim 1, wherein said information on the vehicle collision determines at least one of a severity and pattern of the vehicle collision.

3. The method according to claim 1, further comprising the act of determining a position and movement of the system of coordinates via said sensors located in the vehicle.

4. The method according to claim 3, wherein said plurality of sensors primarily determine vehicle dynamics.

5. The method according to claim 3, wherein said sensors at least partially function as crash sensors.

6. The method according to claim 5, further comprising the act of determining information about an impact point of another object from said output signals of said sensors.

7. The method according to claim 5, further comprising the act of determining information about a direction of impact of another object from said output signals of said sensors.

8. The method according to claim 5, further comprising the act of determining information about an impact speed of another object from said output signals of said sensors.

9. The method according to claim 5, further comprising the act of determining information about a kinetic energy of another object from said output signals of said sensors.

10. The method according to claim 1, further comprising the act of determining information about an impact point of another object from said output signals of said sensors.

11. The method according to claim 1, further comprising the act of determining information about a direction of impact of another object from said output signals of said sensors.

12. The method according to claim 1, further comprising the act of determining information about an impact speed of another object from said output signals of said sensors.

13. The method according to claim 1, further comprising the act of determining information about a kinetic energy of another object from said output signals of said sensors.

* * * * *